United States Patent
Schumacher

(10) Patent No.: US 10,988,096 B2
(45) Date of Patent: Apr. 27, 2021

(54) PROTECTIVE DEVICE FOR A TRIP CIRCUIT FOR A PERSONAL PROTECTION MEANS FOR A VEHICLE, AND TRIP CIRCUIT

(71) Applicant: Robert Bosch GmbH, Stuttgart (DE)

(72) Inventor: Hartmut Schumacher, Freiberg (DE)

(73) Assignee: Robert Bosch GmbH, Stuttgart (DE)

( * ) Notice: Subject to any disclaimer, the term of this patent is extended or adjusted under 35 U.S.C. 154(b) by 92 days.

(21) Appl. No.: 16/086,257

(22) PCT Filed: Mar. 8, 2017

(86) PCT No.: PCT/EP2017/055409
§ 371 (c)(1),
(2) Date: Sep. 18, 2018

(87) PCT Pub. No.: WO2017/162437
PCT Pub. Date: Sep. 28, 2017

(65) Prior Publication Data
US 2020/0290538 A1     Sep. 17, 2020

(30) Foreign Application Priority Data

Mar. 24, 2016 (DE) .......................... 102016204945.3

(51) Int. Cl.
*B60R 21/017* (2006.01)
*B60L 3/00* (2019.01)
*H02H 9/04* (2006.01)
(52) U.S. Cl.
CPC .............. *B60R 21/017* (2013.01); *B60L 3/00* (2013.01); *H02H 9/046* (2013.01)

(58) Field of Classification Search
CPC ......... B60R 21/017; B60R 2023/01122; B60R 2021/01129; B60R 2021/01143;
(Continued)

(56) References Cited

U.S. PATENT DOCUMENTS 8,000,067 B1 * 8/2011 Jin .......................... H02H 9/046
361/56
2005/0200203 A1   9/2005 Uono et al.
(Continued)

FOREIGN PATENT DOCUMENTS

DE          19617250 C1    9/1997
DE          19808987 C1    11/1999
(Continued)

OTHER PUBLICATIONS

International Search Report dated Jun. 7, 2017 of the corresponding International Application PCT/EP2017/055409 filed Mar. 8, 2017.

*Primary Examiner* — Jeff A Burke
*Assistant Examiner* — Joshua Alexander Garza
(74) *Attorney, Agent, or Firm* — Norton Rose Fulbright US LLP; Gerard Messina

(57) ABSTRACT

A protective device for a trip circuit for a personal protection device for a vehicle, the trip circuit having an ignition device, a high-side end stage, and a low-side end stage. The protective device has a high-side interface for contacting the protective device to a high-side terminal and a low-side interface for contacting the protective device to a low-side terminal of the ignition device, a suppressor diode that is connected between the high-side interface and a second voltage potential; and at least one first diode that is connected between the low-side interface and the second voltage potential.

10 Claims, 11 Drawing Sheets

(58) Field of Classification Search
CPC . B60R 2021/01156; B60R 2021/01163; B60R 2021/0117; B60R 21/01; B60R 21/16; B60R 2021/2021; B60R 2021/01075; B60R 2021/01023; B60R 2021/01068; B60R 2021/0115; B60L 3/00; B60G 2800/925
See application file for complete search history.

(56) References Cited

U.S. PATENT DOCUMENTS

| | | | |
|---|---|---|---|
| 2005/0267662 A1* | 12/2005 | Fisher | B60R 21/0173 701/45 |
| 2008/0143180 A1* | 6/2008 | Ito | H02H 9/046 307/10.1 |
| 2014/0126089 A1* | 5/2014 | Chang | H02H 3/202 361/56 |
| 2019/0128945 A1* | 5/2019 | Cho | H03K 5/24 |
| 2019/0190515 A1* | 6/2019 | Colarossi | H02H 3/305 |

FOREIGN PATENT DOCUMENTS

| | | |
|---|---|---|
| DE | 19934559 C1 | 1/2001 |
| DE | 102013211421 A1 | 12/2014 |

* cited by examiner

PROTECTIVE DEVICE FOR A TRIP CIRCUIT FOR A PERSONAL PROTECTION MEANS FOR A VEHICLE, AND TRIP CIRCUIT

FIELD OF THE INVENTION

The present invention is based on a protective device for a trip circuit for a personal protection device for a vehicle, and a trip circuit for a personal protection device, of the type described herein.

BACKGROUND INFORMATION

Airbag systems have high-side end stages and low-side end stages that have to satisfy particular ESD (electrostatic discharge) requirements. These have to do primarily with the safe processing of the components during the production process of the control devices. Here, requirements have to be met corresponding to the human body model (HBM): 100 pF, 1500 ohms discharge resistance, and a charge voltage, depending on the test class, of e.g. +/−2000 V or +/−4000 V, without damage.

In order to meet the substantially higher ESD requirements, which result from the installation of the airbag control device in a vehicle, external additional measures are to be provided, generally capacitances at the ignition circuit high side and the ignition circuit low side of an airbag end stage ASIC.

Generally, the requirements provide contact discharges at the control device pins in the passive state corresponding to HBM models: 330 pF, 2000 ohms, +/−8000 V (ISO 10605).

Likewise, static short circuits to vehicle ground or vehicle supply voltage are to be tolerated. All of these requirements cover, in particular, faults of the vehicle when not in a crash.

Patent document DE 10 2013 211 421 A1 discusses a device for operating a cold gas generator.

SUMMARY OF THE INVENTION

Against this background, the approach presented here provides a protective device for a trip circuit for a personal protection device for a vehicle, and a trip circuit, according to the main claims. Through the measures stated in the dependent claims, advantageous developments and improvements of the device indicated in the independent claim are possible.

Through the use of the protective device, the trip circuit can be protected against damage and malfunctioning, for example in the case of a collision of the vehicle, also referred to hereinafter as a crash, which damage and malfunctioning could be caused for example by a short circuit, caused by an accident, to a consumer installed in the vehicle.

A trip circuit for a personal protection device for a vehicle has an ignition device, a high-side end stage for connecting a high-side terminal of the ignition device to a first voltage potential, and a low-side end stage for connecting a low-side terminal of the ignition device to a second voltage potential.

The personal protection device can for example be an occupant protection device or a pedestrian protection device, for example in the form of an airbag. The personal protection device can be activated using the trip circuit. In the following, the ignition device is also designated an ignition circuit, and can for example include a squib having an ignition charge, in addition to the send and return line. The high-side end stage can have a high-side switch via which a high-side terminal of the ignition device can be connected in electrically conductive fashion to the first voltage potential, for example to a conductor or terminal that conducts the first voltage potential. The first voltage potential can for example correspond to an ignition voltage for igniting the ignition device. The low-side end stage can have a low-side switch via which a low-side terminal of the ignition device can be connected in electrically conductive fashion to the second voltage potential, for example to a conductor or terminal that conducts the second voltage potential. The second voltage potential can for example correspond to a ground potential. The robustness of the trip circuit against injection currents can be improved by the protective device.

The protective device for the trip circuit has a high-side interface for contacting the protective device to the high-side terminal of the ignition device and a low-side interface for contacting the protective device to the low-side terminal of the ignition device, and has a suppressor diode that is connected between the high-side interface and the second voltage potential, and has at least one first diode that is connected between the low-side interface and the second voltage potential.

The high-side interface and the low-side interface can each include one or more terminals or lines via which the protective device can be connected in electrically conductive fashion to the terminals of the ignition device.

The anode of the suppressor diode and, correspondingly or alternatively, the anode of the first diode can be connected to the second voltage potential. Via the named diodes, for example injection currents can be discharged.

The protective device can have a second diode that is connected between the low-side interface and the second voltage potential. In this way a parallel circuit of two diodes can be realized. The two diodes enable a reduction of the current load of diodes of the low-side end stage.

The first diode and the second diode can be situated on a die. A die can be understood as a semiconductor substrate piece. The common configuration on a die enables a low-cost and space-saving realization.

The protective device can have a further suppressor diode that is connected between the high-side interface and the low-side interface. This enables an injection current to be led past the ignition device.

Here, both suppressor diodes can be situated on one die. This can be the die already named or can be an additional die.

According to a specific embodiment, the ignition device can be realized as an airbag ignition circuit. Advantageously, the described approach can be implemented in ignition devices that are installed in areas of a vehicle that may be deformed in the case of a collision.

A trip circuit for a personal protection device for a vehicle has the following features:

an ignition device;

a high-side end stage for connecting a high-side terminal of the ignition device to a first voltage potential;

a low-side end stage for connecting a low-side terminal of the ignition device to a second voltage potential; and a named protective device that contacts the high-side terminal of the ignition device via the high-side interface and contacts the low-side terminal of the ignition device via the low-side interface.

In addition, a method is presented for protecting a trip circuit for a personal protection device for a vehicle from the effect of an injection current injected into the trip circuit, the trip circuit having an ignition device, a high-side end stage for connecting a high-side terminal of the ignition device to a first voltage potential, and a low-side end stage for connecting a low-side terminal of the ignition device to a second voltage potential. The method includes the following steps:

discharging at least a part of the injection current via a suppressor diode connected between the high-side terminal and the second voltage potential; and discharging at least a part of the injection current via at least one first diode connected between the low-side terminal and the second voltage potential.

The injection current can be a negative or a positive current. The discharging of the injection current can prevent malfunctions and damage to the trip circuit. The steps of the method can be realized for example using devices of the named protective device.

According to a specific embodiment, in addition at least a part of the injection current, in particular a part of the injection current that could flow via the ignition device, is discharged through a parallel path formed by a suppressor diode connected between the low-side terminal and the high-side terminal. The suppressor diode connected parallel to the ignition device can provide further protection of the ignition device.

Exemplary embodiments of the approach presented here are shown in the drawings and are explained in more detail in the following description.

DETAILED DESCRIPTION

Figure 1:
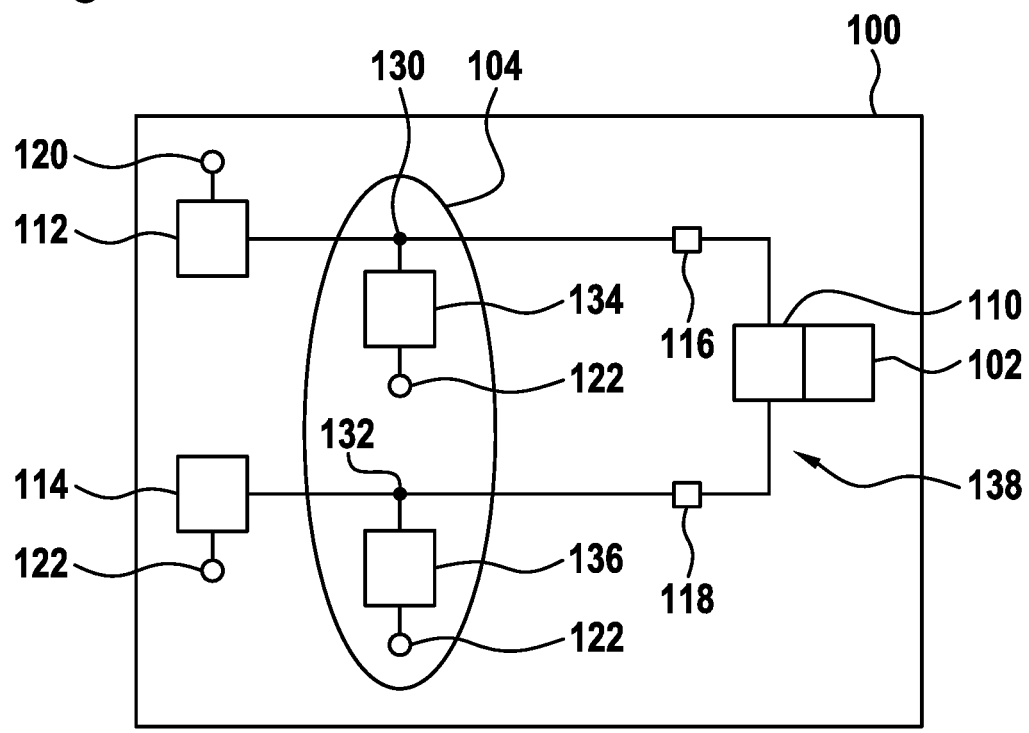
FIG. 1 shows a schematic representation of a vehicle having a protective device for a trip circuit for a personal protection device according to an exemplary embodiment.

In the following description of advantageous exemplary embodiments of the present invention, identical or similar reference characters are used for elements shown in the various Figures having similar functions, and repeated description of these elements is omitted.

FIG. 1 shows a schematic representation of a vehicle 100 having a personal protection device 102 and a protective device 104 for a trip circuit of personal protection device 102 according to an exemplary embodiment. For example, personal protection device 102 is an airbag that can be activated using the trip circuit in the case of a collision, in order for example to protect a driver of vehicle 100 from the consequences of the collision.

The trip circuit includes an ignition device 110, a high-side end stage 112, and a low-side end stage 114. Ignition device 110 is connected to high-side end stage 112 via a high-side terminal 116, and is connected to low-side end stage 114 via a low-side terminal 118. Through a suitable controlling of high-side end stage 112, high-side terminal 116 of ignition device 110 can be connected to a first voltage potential 120, which corresponds for example to an ignition voltage for igniting ignition device 110. Through a suitable controlling of low-side end stage 114, low-side terminal 118 of ignition device 110 can be connected to a second voltage potential 122 that corresponds for example to a ground potential. If end stages 112, 114 are correspondingly connected, then terminals 116, 118 of ignition device 110 are connected to potentials 120, 122, resulting in an ignition current that flows through ignition device 110 and activates the ignition device.

Protective device 104 has a high-side interface 130 and a low-side interface 132. Via high-side interface 130, in the installed state protective device 104 is connected in electrically conductive fashion to high-side terminal 116 of ignition device 110. Via low-side interface 132, in the installed state protective device 104 is connected in electrically conductive fashion to low-side terminal 118 of ignition device 110.

A suppressor diode 134 of protective device 104 is connected between high-side interface 130 and a terminal that, in the operation-ready state of protective device 104, conducts second voltage potential 122. At least one first diode 136 is connected between low-side interface 132 and a terminal that, in the operation-ready state of protective device 104, conducts second voltage potential 122.

Through protective device 104, the trip circuit can be protected against undesired effects of an injection current 138 that, in the case of a collision of vehicle 100 and a resulting deformation of vehicle 100, may in some circumstances be injected into a conductor segment of the trip circuit.

The described approach does not have to do with protective components that enable a danger-free controlling of pyrotechnic ignition circuits 110; rather, what is concerned is the "vehicle crash case" and the dangers that other devices can exert on ignition circuits 110, in particular if such circuits are used in the crash zone.

In the following, this is explained with reference to an example. Here, a pyrotechnic ignition circuit 110 in the engine compartment is used to interrupt the vehicle battery-generator connection.

In an assumed case of a crash, the engine compartment is deformed and the cabling (line to and from) of ignition circuit 110 in the engine compartment is short-circuited with an electrical consumer, and the supply of power to this consumer is broken.

Now the airbag control device is exposed, via the ignition lines, to the dangers that this consumer can exert on the connected airbag electronics. The risk is particularly great in the case of inductive consumers such as motors, ignition coils, or horns.

According to an exemplary embodiment, the design of the protective device is optimized for the properties of the airbag electronics, and prevents these electronics from being affected sympathetically by the above-described process in such a way that a RESET recognition can occur in the system ASIC, caused by substrate currents, or that this ASIC is destroyed. In this way, the airbag system can be prevented from failing or partly failing in the case of a crash, depending on the temporal occurrence of the disturbance, or an undesired activation of ignition circuits 110 at the wrong time can be prevented. Thus, the protective device enables protective measures at airbag ignition circuit 100 against outside influences, in particular inductive outside influences.

Figure 2:
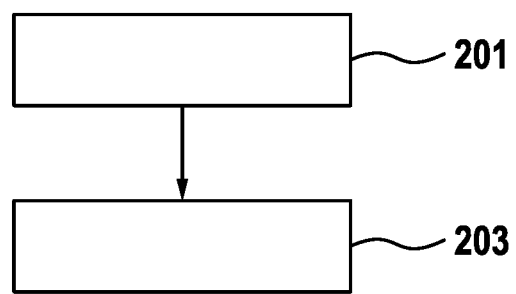
FIG. 2 shows a flow diagram of a method for protecting a trip circuit for a personal protection device according to an exemplary embodiment.

FIG. 2 shows a flow diagram of a method for protecting a trip circuit for a personal protection device according to an exemplary embodiment. This can be the trip circuit shown in FIG. 1.

According to an exemplary embodiment, the method is carried out when at least one injection current is injected into the trip circuit. In this case, at least a part of the injection current is discharged via a suppressor diode 134, as is described on the basis of FIG. 1, and in addition or alternatively at least a part of the injection current is discharged via at least one first diode 136, as described on the basis of FIG. 1. Correspondingly, steps 201, 203 can be carried out simultaneously, temporally offset from one another, or also only individually.

In addition, in one of the steps 201, 203 of discharging, or in a further step of discharging, a part of the injection current that could flow via the ignition device is discharged via a parallel path. According to an exemplary embodiment, the parallel path is formed by a suppressor diode that is connected between the low-side terminal and the high-side terminal, and thus parallel to the ignition device.

Figure 3:
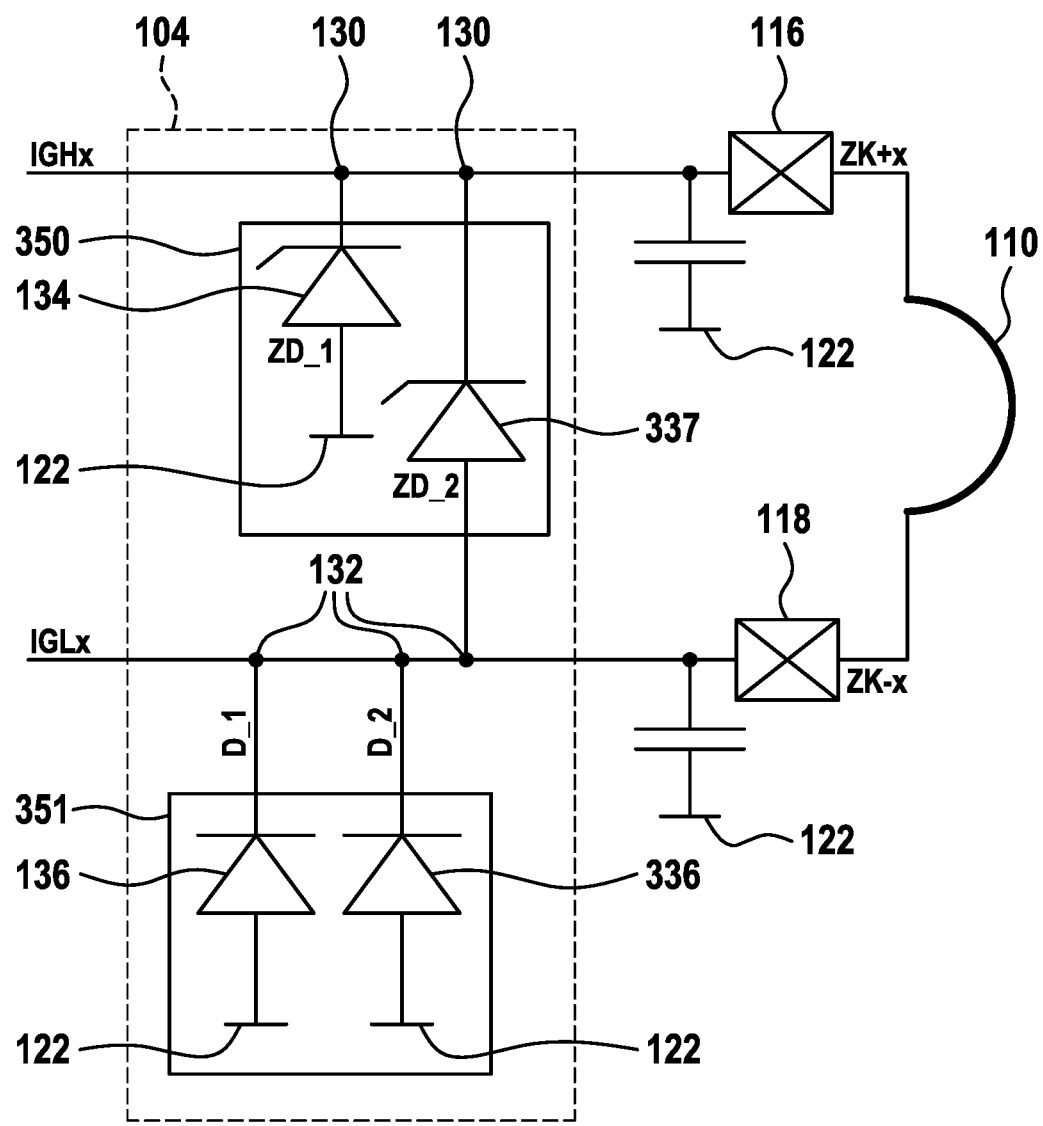
FIG. 3 shows a protective device for a trip circuit for a personal protection device according to an exemplary embodiment.

FIG. 3 shows a protective device 104 for a trip circuit for a personal protection device according to an exemplary embodiment. This can be an exemplary embodiment of the protective device 104 and trip circuit described on the basis of FIG. 1.

Here and in the following, high-side terminal 116 is also designated "ZK+x" and low-side terminal 118 is also designated "ZK−x." According to this exemplary embodiment, the cathode of suppressor diode 134 is connected to high-side terminal 116 of ignition device 110 via high-side interface 130. Here and in the following, suppressor diode 134 is also designated "ZD_1."

According to this exemplary embodiment, the cathode of first diode 136 is connected to low-side terminal 118 of ignition device 110 via low-side interface 132. Here and in the following, first diode 136 is also designated "D_1."

A terminal that connects high-side terminal 116 to the high-side end stage is designated here and in the following as "IGHx," and a terminal that connects low-side terminal 118 to the low-side end stage is designated here and in the following as "IGLx."

Optionally, protective device 104 has a second diode 336 that is connected parallel to first diode 136, and is also designated in the following as "D_2."

Optionally, protective device 104 has a further suppressor diode 337 that is connected between interfaces 130, 132. According to this exemplary embodiment, the cathode of further suppressor diode 337 is connected to high-side interface 130. Here and in the following, further suppressor diode 337 is also designated "ZD_2."

Conductor segments situated between interfaces 130, 132 and terminals 116, 118 are each coupled to second voltage potential 122, here ground, via a capacitor.

According to an exemplary embodiment, protective device 104 is a protective circuit of an ignition device 110 realized as an ignition circuit, in particular an airbag ignition circuit. In the following, protective device 104 is also designated protective circuit 104, and ignition device 110 is also designated ignition circuit 110.

Protective device 104 makes it possible to ensure the robustness of specific ignition circuits 110 of the airbag control device that are situated in the crush zone of vehicles, such as the separation of the battery from the generator, triggering of the engine hood lifting, activation of extinguisher devices, etc., against short circuits to inductive consumers. In particular, protection of the overall functioning of the control device against danger is enabled in the case of a crash if massive electrical loads result at external ignition circuits 110 in the crush zone.

The robustness of ignition circuit 110 in the crush zone against current injection is increased by a multiple factor relative to the design shown in the following on the basis of FIGS. 4 and 5.

Specifically, through the approach described here the danger of false triggering by an injection current can be reduced. Here, peak values between 4 A and 8 A can be reached.

In addition, the destruction of the ignition circuit end stages and aftereffects, such as RESET, can be prevented up to very high injection current levels (>20 A).

Advantageously, a uniform ASIC ignition circuit end stage design can be made usable for up to n ignition circuit connections, with uniform requirements for the vehicle interior compartment (driver airbag, . . . ), by protective circuit 104 for the vehicle crush zone.

According to the exemplary embodiment shown in FIG. 3, protective circuit 104 includes the two suppressor diodes ZD_1, ZD_2. According to an exemplary embodiment, suppressor diodes ZD_1, ZD_2 are realized as a suppressor diode pair on a die 350 in a package.

In addition, the protective circuit according to the exemplary embodiment shown in FIG. 3 includes the two diodes D_1, D_2.

According to an exemplary embodiment, the two diodes D_1, D_2 are realized as fast switching diodes, and according to an exemplary embodiment are realized as a switching diode pair on a die 351 in a package. Here, according to an exemplary embodiment suppressor diodes ZD_1, ZD_2 and diodes D_1, D_2 are situated on separate dies enclosed by separate packages.

Figure 4:
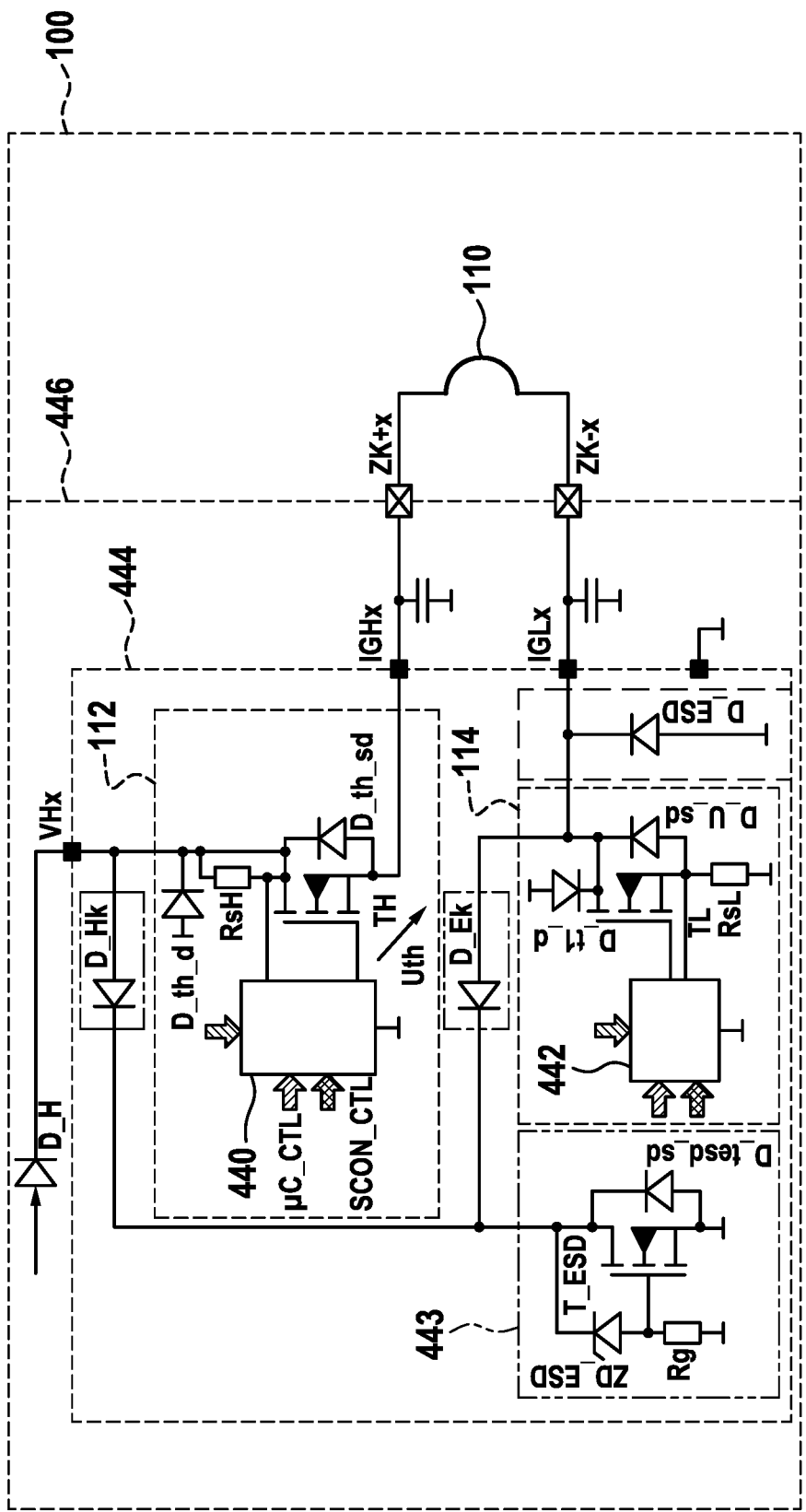
FIG. 4 shows a schematic representation of a vehicle having an ignition circuit protective wiring for a trip circuit for a personal protection device.

FIG. 4 shows a schematic representation of a vehicle 100 having ignition circuit protective circuitry for a trip circuit for a personal protection device.

The trip circuit has an ignition device 110, here in the form of an ignition circuit having a squib, a high-side end stage 112, and a low-side end stage 114.

High-side end stage 112 has functionalities of a driver, a regulator, and of a device 440 that realizes a logic system via which a switch, here a transistor TH of high-side end stage 112, is controlled. Device 140 is configured to receive at its input side, in addition to signals μC_CTL and SOON_CTL, auxiliary voltages and references relating to current and voltage. High-side end stage 112 additionally has a diode D_th_d, a shunt resistor RsH, and a diode D_th_sd of transistor TH, with regard to which a voltage Uth is shown in FIG. 4. At the input side, high-side end stage 112 is supplied with an ignition voltage, connected via a diode D_H and a terminal VHx. A line that connects high-side end stage 112 to high-side terminal ZK+x is coupled to ground via a capacitor in the form of an EMV/ESD-MLCC.

Low-side end stage 114 has the functionalities of a driver, a regulator, and of a device 442 that realizes a logic system, via which a switch, here a transistor TL of low-side end stage 114, is controlled. Device 442 is configured to receive at the input side, in addition to further signals, auxiliary voltages and references relating to current and voltage. Low-side end stage 112 additionally has a diode D_th_d, a shunt resistor RsL, and a diode D_th_sd of transistor TL. In addition, a shunt resistor RsL connected to ground is shown. A line that connects low-side end stage 114 to low-side terminal ZK−x is coupled to ground via a diode D_ESD of a negative IGL-ESD-P circuit and via a capacitor in the form of an EMV/ESD-MLCC.

End stages 112, 114 are realized in a system ASIC 444, together with diode D_ESD, further diodes D_HK, D_LK, and a positive IGH/IGL_ESD-P circuit 443 that includes a transistor T_ESD having a diode D_tesd_sd of a further Zener diode ZD_ESD and a resistor RG.

System ASIC 444 is situated on a circuit board 446 realized as an airbag ECU-PCB.

Figure 5:
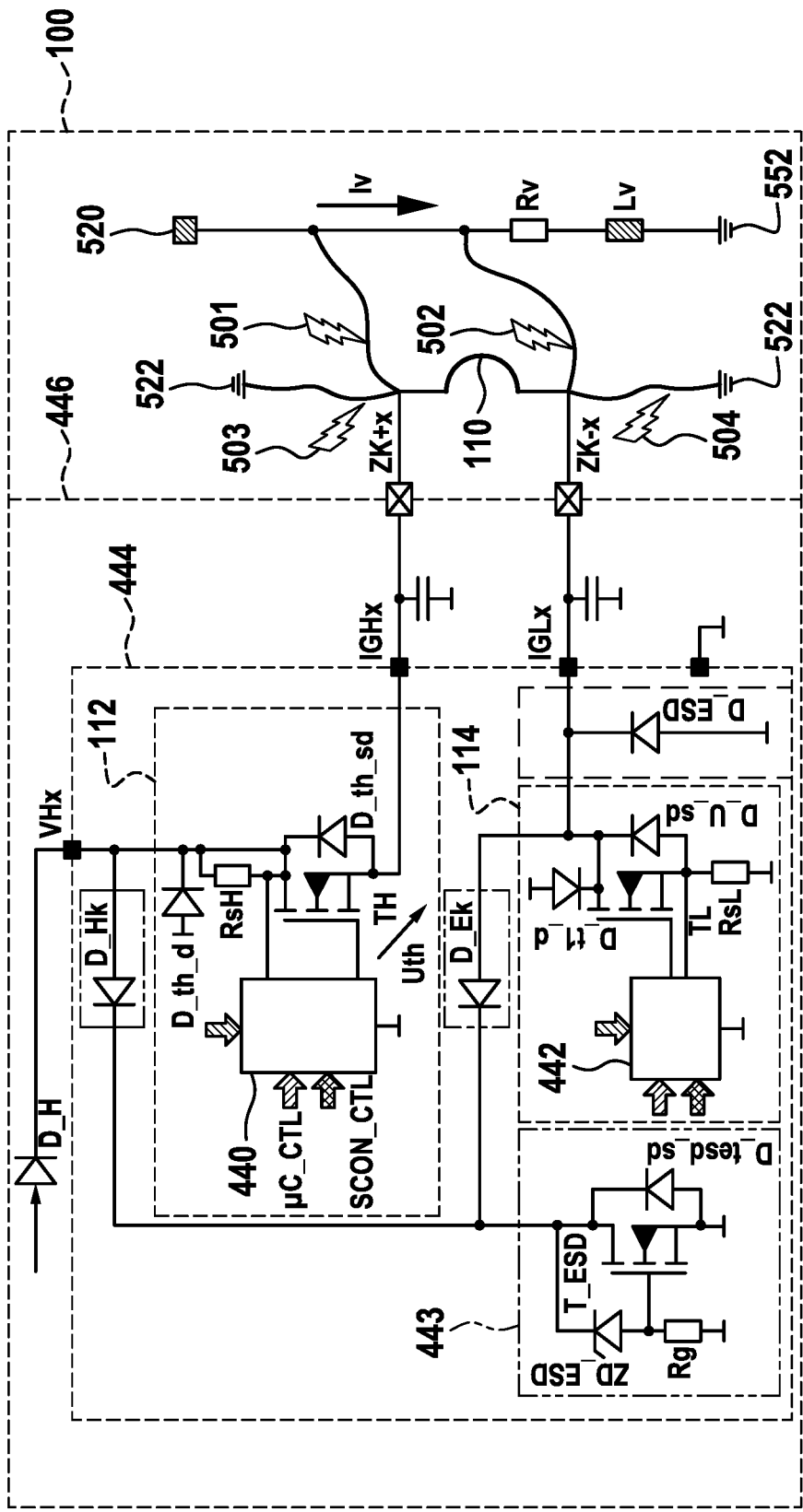
FIG. 5 shows a schematic representation of possible injection currents relating to the trip circuit shown in FIG. 4.

FIG. 5 shows a schematic representation of possible short circuit variants 501, 502, 503, 504 relating to the trip circuit shown in FIG. 4.

In addition, in FIG. 5 a voltage potential 520 is shown that represents the potential vehicle plus (6 . . . 20V) 520, and vehicle chassis ground 522 is shown. In addition, a current Iv is shown that flows between potentials 520, 522 via a resistor Rv and an inductor Lv.

According to this exemplary embodiment, ignition device 110 has a resistor Rsq having a value from 1.7 to 2.5 ohms.

In the following, the ignition circuit performance of the circuit described on the basis of FIGS. 4 and 5 is considered on the basis of various ZK short-circuit variants 501, 502, 503, 504.

The ignition circuit end stages (high-side, low-side) 112, 114, and the ignition circuit circuitry, are configured such that a static short-circuit at the ignition circuit plus (ZK+)/minus (ZK−) side to vehicle plus (6 V . . . 20 V) 520, as shown in variants 501, 502, cannot cause any currents over ignition device 110, in the form of a squib, that could cause an undesired triggering.

For this purpose, EMV capacitors at terminals ZK+x, ZK−x are dimensioned such that the caused charge current does not exceed the "no fire" requirements (e.g. 5 A@4 82 s) of squib 110.

All transistor structures TH, TL, and pos. IGH/IGL element 443, do not conduct before 36V, depending on the process of ASIC 444.

Ignition circuit end stages (high-side, low-side) 112, 114, and the ignition circuit circuitry, are configured such that a static short-circuit at the ignition circuit plus (ZK+)/minus (ZK−) side to vehicle ground (chassis) 522, as shown in variants 503, 504, cannot cause any currents over ignition element 110 that could cause an undesired triggering.

For this purpose, a quasi-static ground offset of approximately 1.5 V between the airbag control device ground and vehicle chassis ground 522 must not occur; otherwise, the "no fire" requirement (e.g. 0.4A@l0s) of squib 110 will not be maintained in case of error 503, because low-side ESD diodes D_ESD will conduct.

Likewise, in case of error 504, a quasi-static ground offset of approximately 4 V (Uth=2.5V+1.5V) between the airbag SG ground and vehicle chassis ground 522 must not occur; otherwise, the "no fire" requirement (e.g. 0.4 A@10 s) of squib 110 will not be maintained, because when ignition voltage VHx is shut off, diode D_th_d and high-side transistor TH will conduct.

Figure 6:
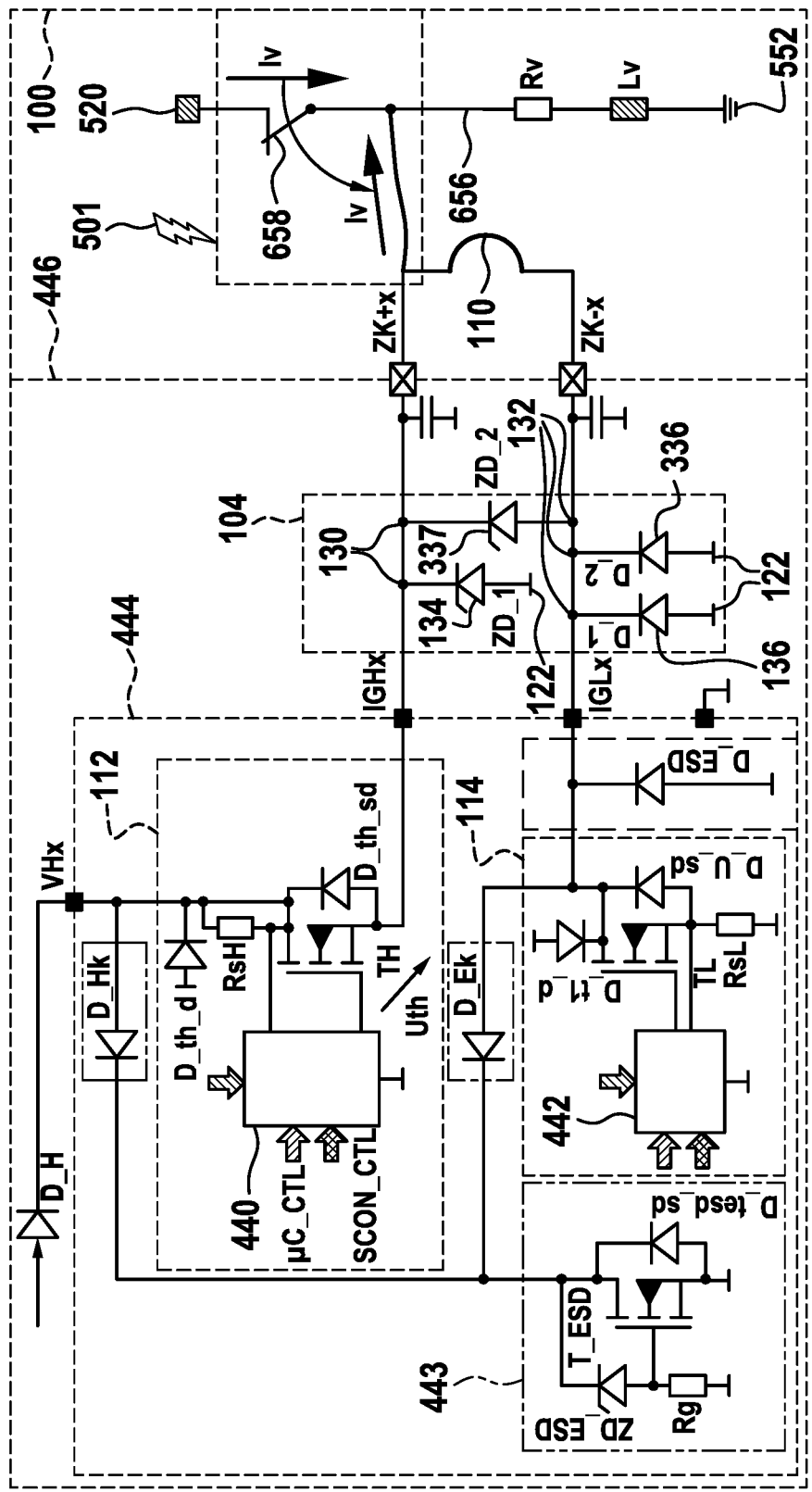
FIG. 6 shows a schematic representation of a vehicle having a protective device for a trip circuit for a personal protection device according to an exemplary embodiment.

FIG. 6 shows a schematic representation of a vehicle 100 having a protective device 104 for a trip circuit for a personal protection device according to an exemplary embodiment. The trip circuit corresponds to the circuit described on the basis of FIG. 4, supplemented by protective device 104. According to an exemplary embodiment, protective device 104 is the protective device described on the basis of FIG. 3.

In addition, a case 501 of a possible injection current is shown. For this purpose, corresponding to FIG. 5, voltage potential 520 is shown, which represents the potential vehicle plus (6 . . . 20 V), and vehicle chassis ground 522 and possible current curves are shown of a current Iv that flows between potentials 520, 522 over resistor Rv and inductor Lv.

According to an exemplary embodiment, protective device 104 is realized as an ignition circuit protective circuitry for the crash zone of vehicle 100.

Protective device 104 offers adequately effective protective measures when, at ignition circuit 110, there occur short circuits to inductive consumers in the crash zone whose power supply is cut away under load, which amounts to an electrical separation. Such a case 501 is shown in FIG. 6. Here, in the crash zone of ignition circuit 110 there is pressure against the power supply line 656 of an inductive consumer Lv, for example the horn or an electric motor of vehicle 100, and consumer supply line 656 is cut away, as is indicated by switch 658 in FIG. 6.

In this case 501, current Iv in the consumer commutates into the ignition circuit short-circuit as an injection current.

On the one hand, this current has to be kept away from squib 110, and on the other hand it must not be allowed to overload the ESD and input structures of high-side and low-side end stages 112, 114, or to damage them in such a way that a RESET monitoring in system ASIC 444 could respond.

Figure 7:
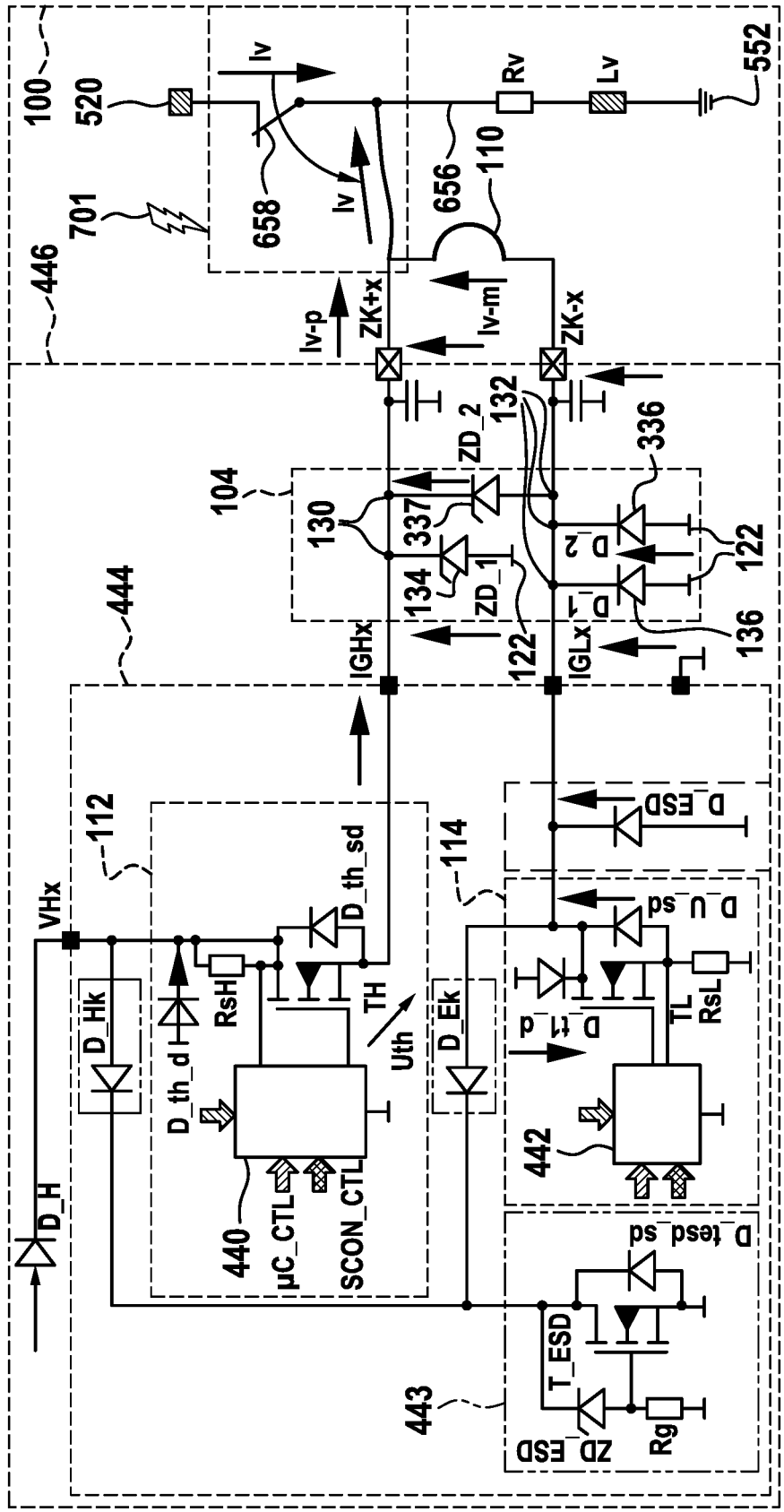
FIG. 7 shows a schematic representation of possible injection currents relating to the trip circuit shown in FIG. 6 according to an exemplary embodiment.

FIG. 7 shows a schematic representation of possible injection currents relating to the trip circuit shown in FIG. 6 according to an exemplary embodiment. In particular, a current division at the short-circuited ignition circuit 110 after a current commutation is shown, as is described on the basis of FIG. 6. This scenario is described in the following on the basis of the case 701 shown in FIG. 7.

Through protective circuit 104, also designated "ZK-PC_CZ" (ignition circuit protection circuit crash zone), the injection current caused by the commutation of consumer current Iv into ignition circuit 110 is theoretically split into two sub-currents Iv_p, Iv_m at the injection point, indicated by the arrow representing case 701.

Sub-current Iv_m over squib 110 should not violate the "no fire" condition in a first load case.

For this purpose, current Iv_m is to be kept below 0.4 A for relevant times >4 µs.

For this purpose, suppressor diode ZD_1 is placed between control device ground 122 (anode) and terminal ZKx+ (cathode). According to an exemplary embodiment, suppressor diode ZD_1 has a small rd_zdf (differential resistance, forward), in order to conduct as much injection current away to ground 122 as possible.

At terminal ZKx−, a fast switching diode pair D_1, D_2 is placed between control device ground 122 (anode) and ZKx− (cathode).

This is done, according to an exemplary embodiment, in order to reduce the current load of the ASIC low-side diodes and to prevent the risk of destruction or a reset recognition. According to an exemplary embodiment, the choice of a switching diode pair D_1, D_2 is made with average rd_df.

Depending on the position of the short-circuit location, a further suppressor diode ZD_2, in particular as a second diode of a cathode-coupled suppressor diode pair ZD_1, ZD_2, between the terminals ZKx− (anode) and ZKx+ (cathode), can prove successful as an optimization so that a part of the injection current does not have to be routed via squib 110.

Here, the following assumptions are made:

For the simple consideration of high current injection at injection circuit 110, all diodes can be set to the same forward voltage (small differences play no role; what is important is the differential resistance), resulting in a voltage Uf=0.8 V.

All ZK EMV/ESD capacitances are unimportant in the time range >4 μs.

Figure 8:
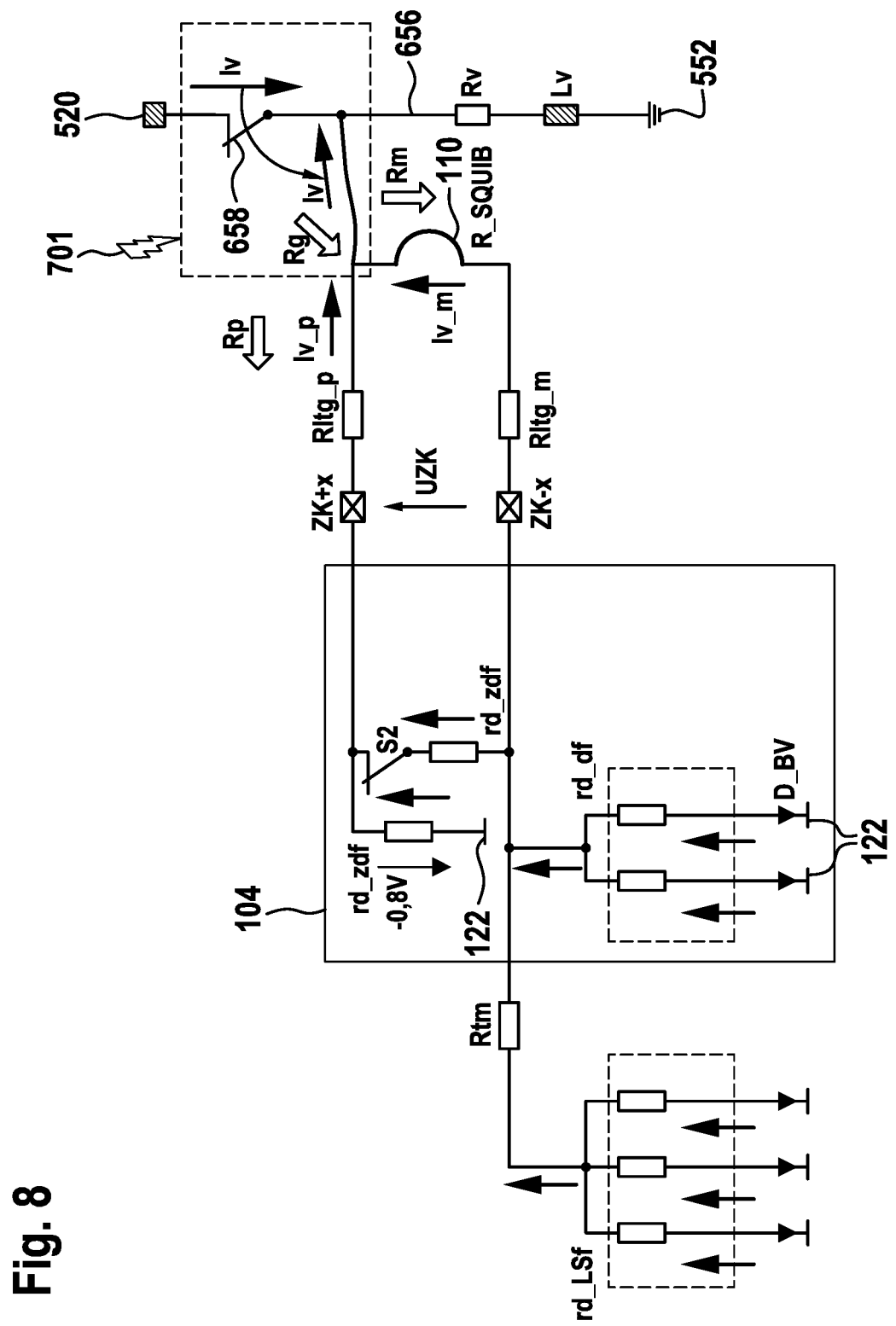
FIG. 8 shows a model of an effect of an injection current relating to the trip circuit shown in FIG. 6 according to an exemplary embodiment.

FIG. 8 shows a model of an effect of an injection current relating to the trip circuit shown in FIG. 6, according to an exemplary embodiment. In particular, an ignition circuit model is shown of the effect of injection current Iv on squib 110. Here, the suppressor diode of protective circuit 104 is modeled by a resistor rd_zdf, the further suppressor diode is modeled by a resistor rd_zdf and a switch S2 that is closed when voltage UZK between terminals ZK+, ZK−x is >0.8 V, and the first and second diode are modeled by resistor rd_df. Ignition device 110 is modeled by the supply and return conducting resistors Rltg_p, Rltg_m, as well as the squib resistor R_SQUIB.

As examples, the following values are assumed:
R_SQUIB=2.15 ohms
Rltg_p=0.175 ohms; (5 m; Cu)
Rltg_m=0.175 ohms; (5 m; Cu)
Rtm=0.2 ohms; (Track, Bonds)
rd_zdf=0.2 ohms
rd_df=0.5 ohms
rd_Lsf=0.33 ohms
Iv=peak consumer current
Lv=1 mH From the ignition circuit model shown in FIG. 8 of the effect of injection current Iv on squib 110, the following values result for the case in which switch S2 is open:
Rp=Rltg_p+rd_zdf=0.375 ohms
Rm=R_SQUIB+Rltg_m+rd_df*(Rtm+rd_LSf)/(rd_df+Rtm+rd_LSf)=2.15 ohms+0.175 ohms+0.5 ohms*(0.2 ohms+0.33 ohms)/(0.5 ohms+0.2 ohms+0.33 ohms)=2.325 ohms+0.257 ohms=2.582 ohms
Rg=Rp*Rm/Rp−Rm)=0.327 ohms
Iv_m/Iv=Rg/Rm->Iv_m=*(Rg/Rm)−Iv*0.127
Iv_m_nofire=0.4 A->Iv_nofire=0.4 A/0.127=3.15 A
Iv_p_nofire=Iv_noflre−Iv_n_nofire=2.7
UZK_nofire=Iv_m_nofire*(Rltg_m+R_SQUIB)−Rltg_p*Iv_p_nofire=0.4 A*(0.175+2.15)ohms−0.175 ohms*2.75 A=0.448 V->assumpt on S2=open is true.

The ignition circuit wiring for the crash zone increases the robustness of the relative squib 110 against injection currents, in particular those of a dying inductive nature, by approximately a factor of ten.

If the short-circuit point is situated closer to the control device, then due to closed switch S2, which is synonymous with saying that further suppressor diode ZD_2 is conductive, there results a further increase in the robustness of the relevant squib against injection currents relative to the standard (0.4 A), by up to a factor of 20.

Figure 9:
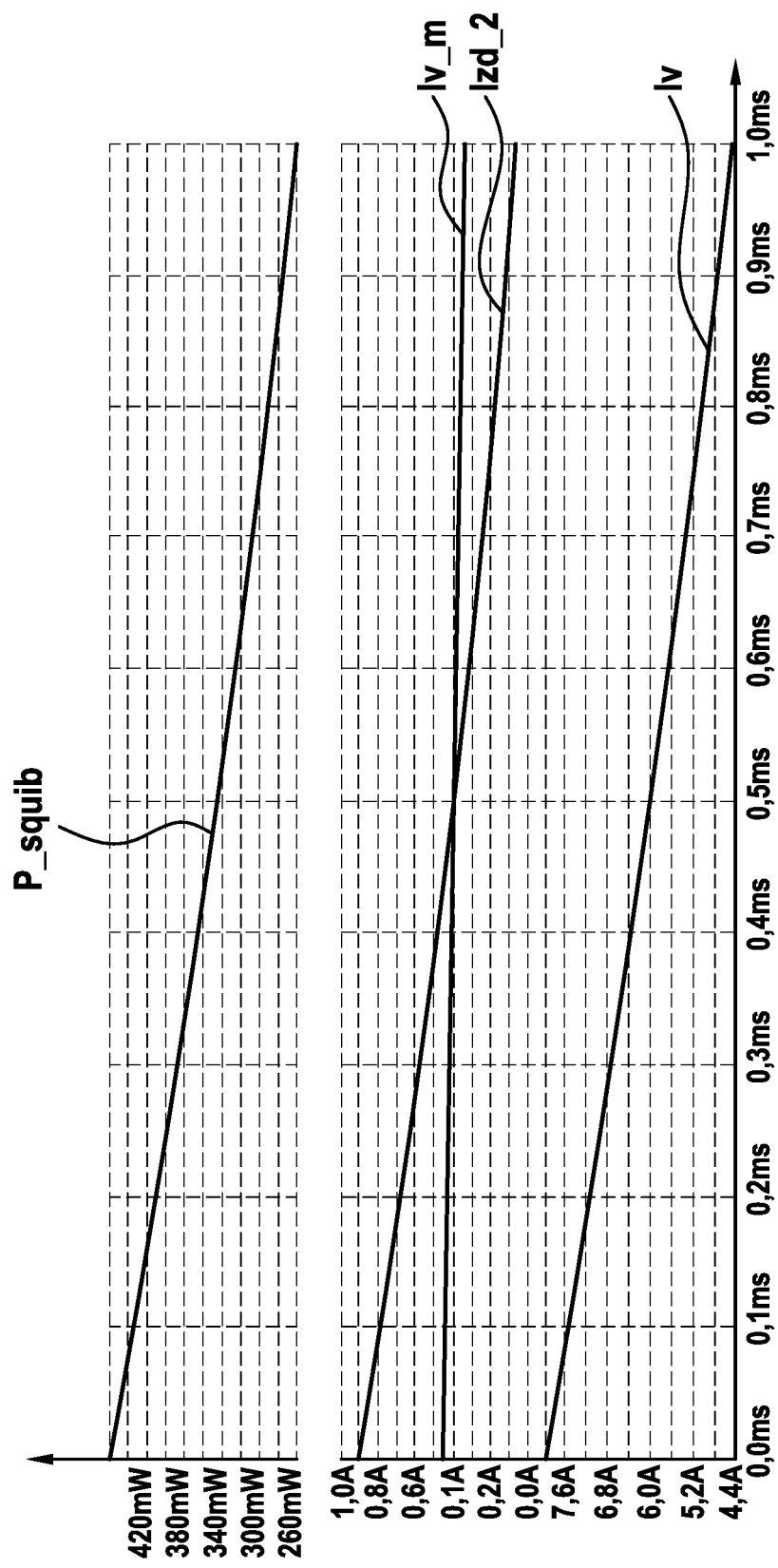
FIG. 9 shows a graphic representation of injection currents relating to the trip circuit shown in FIG. 6 according to an exemplary embodiment.

FIG. 9 shows a graphic representation of injection currents Iv, Iv_m, Izd_2, as well as the power level P_squib falling at the ignition device, for the trip circuit shown in FIG. 6, according to an exemplary embodiment.

In a time span from 0.0 ms to 1.0 ms, the current Iv falls off from a value of approximately 8 A to 4.4 A.

In the time span from 0.0 ms to 1.0 ms, the current Iv_m falls off from a value of approximately 0.45 A to 0.35 A. In the time span from 0.0 ms to 1.0 ms, the current Izd_2 falls off from a value of approximately 0.9 A to 0.1 A.

In the time span from 0.0 ms to 1.0 ms, the power level P_squib falls off from a value of approximately 460 mW to 260 mW.

FIG. 9 shows that the "no fire" injection current curve is 20× above the standard of 0.4 A. Here the following parameter holds: Iv(peak)=8 A@4 mH@2 ohms.

Squib current Iv_m is on average approximately 400 mA and is thus at the "no fire" boundary. At least a part of injection current Iv is also conducted via diode ZD_2 in the depicted curve (S2 closed).

Figure 10:
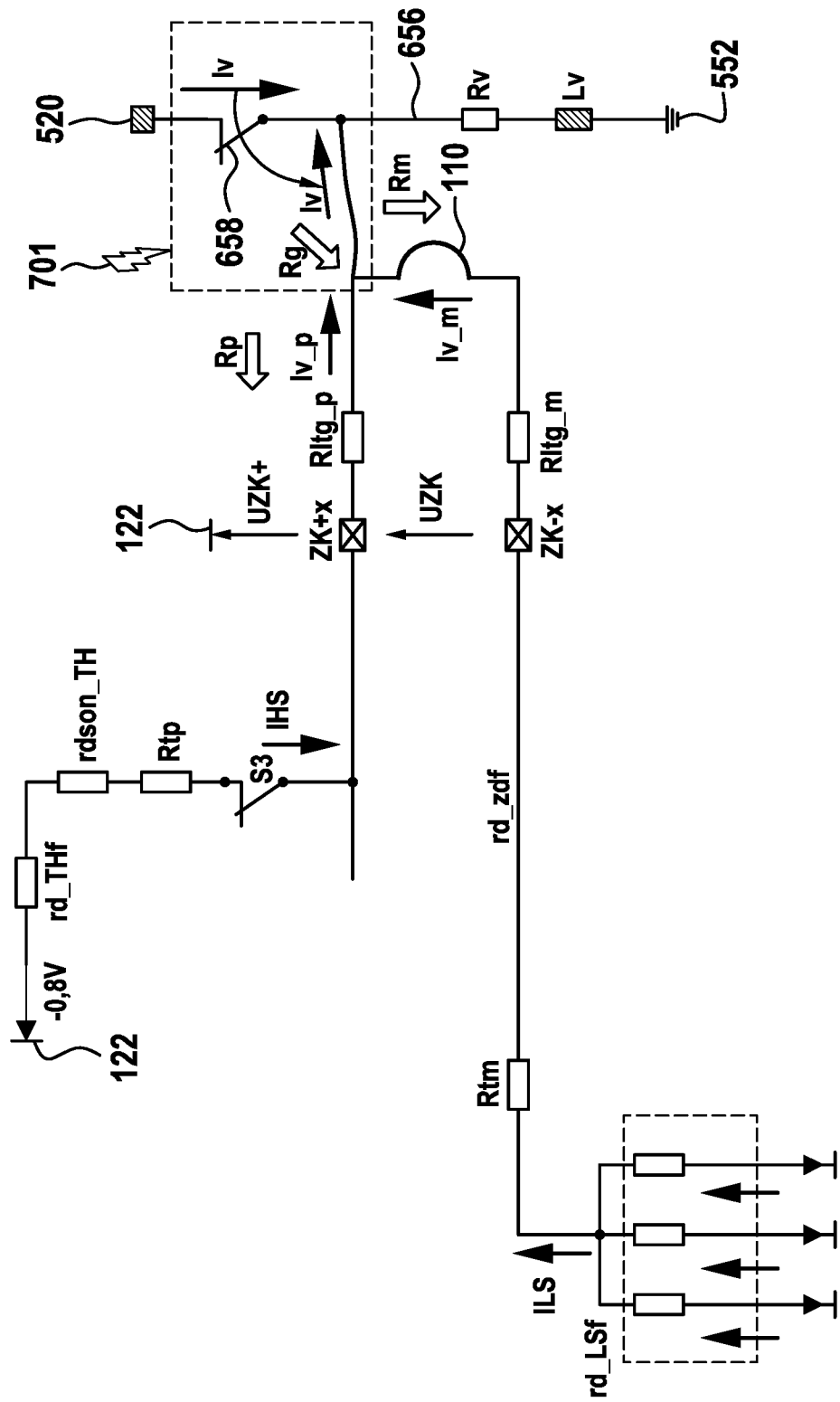
FIG. 10 shows a model of an effect of an injection current relating to the trip circuit shown in FIG. 6 according to an exemplary embodiment.

FIG. 10 shows a model of an effect of an injection current with respect to the trip circuit shown in FIG. 4, according to an exemplary embodiment. In particular, an injection circuit model is shown for the effect of injection current Iv on the end stages. The trip circuit is not protected by the protective device described on the basis of FIG. 6.

In addition to squib 110 of a system ASIC affected by injection current Iv, dangers must be averted by the system ASIC itself, so that no resulting faults (reset; damage affecting neighboring functions) occur.

If the overload limit of an airbag high side/low-side end stage is (assumed) approximately 6 A@2 ms injection current Iv, the improvement factor caused by the new protective wiring can be ascertained.

Corresponding to the model described on the basis of FIG. 8, as examples the following values are assumed:
R_SQUIB=2.15 ohms
Rltg_p=0.175 ohms; (5 m; Cu)
Rltg_m=0.175 ohms; (5 m; Cu)
Rtm=0.2 ohms; (Track, Bonds)
rd_LSf=0.33 ohms
rd_THf=0.5 ohms
rdson_TH=0.5 ohms
Rtp=0.2 ohms; (Track, Bonds)
Iv=peak consumer current
Lv=1 mH
Switch S3 is closed when voltage UZK+<−3.3 V.

From the ignition circuit model shown in FIG. 10 for the effect of injection current Iv of injection current Iv, the following values result when there is no protective device and for the case in which switch S3 is closed:
Rp=Rltg_p+Rtp+rdson_TH+rd_THf=1.375 ohms
Rm=R_SQUIB+Rltg_m+Rtm+rd_LSf=2.855 ohms
Rg=Rp*Rm/(Rp+Rm)=0.928 ohms
Iv_m/Iv=Rg/Rm->Iv_m=Iv*(Ra/Rm)=Iv*0.325
Iv_m_max=6 A->Iv_max=6 A/0.325=18.5 A
Iv_p=HIS@Iv_m_max->12.5 A However, this robust state is maintained only for about 30 to 70 μs; after this the squib is activated and forms an interruption.

Thus, no improvement factor results with regard to the design shown on the basis of FIG. 4.

Injection current Iv cannot become greater than the overload limit of the high side/low-side end stage (e.g. 6 A).

Figure 11:
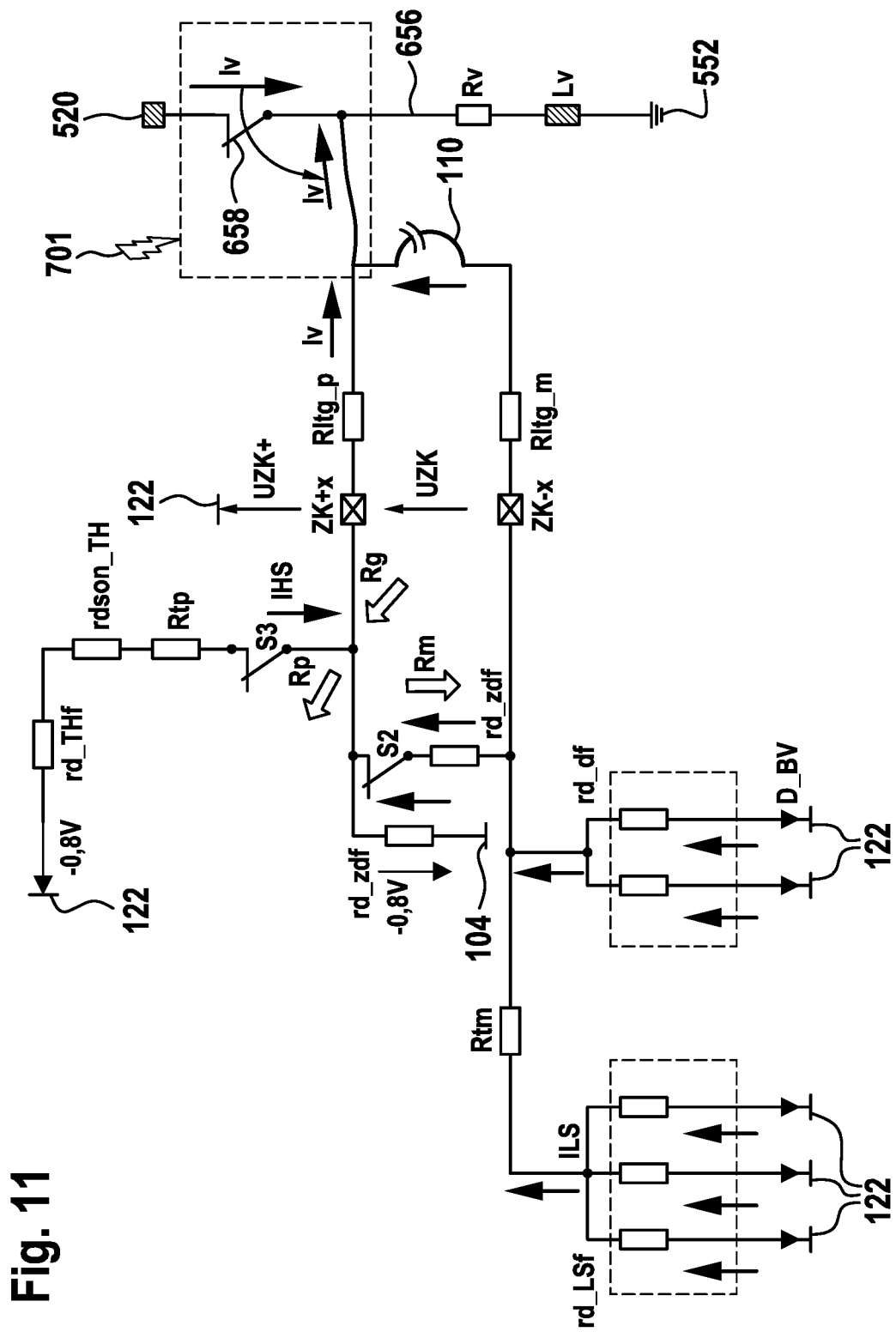
FIG. 11 shows a model of an effect of an injection current relating to the trip circuit shown in FIG. 6 according to an exemplary embodiment.

FIG. 11 shows a model of an effect of an injection current Iv on the trip circuit shown in FIG. 6 having a protective device, according to an exemplary embodiment. In particular, an ignition circuit model is shown of the effect of injection current Iv on end stages 110.

The following values are assumed as examples:
R_SQUIB=2.15 Ohm
Rltg_p=0.175 Ohm; (5 m; Cu)
Rltg_m=0.175 Ohm; (5 m; Cu)
Rtm=0.2 Ohm; (Track, Bonds)
rd_zdf=0.2 Ohm
rd_df=0.5 Ohm
rd_LSf=0.33 Ohm.
rd_THf=0.5 ohms
rdson_TH=0.5 ohms
Rtp=0.2 Ohm; (Track, Bonds)
Iv=peak consumer current
Lv=1 mH From the ignition circuit model shown in FIG. 8 of the effect of injection current Iv on squib 110, due to the protective device improvements result for the case of already-activated squib 110 (open).

Switch S2 is closed when voltage UZK>0.8 V.
Switch S3 is closed when voltage UZK>−3.3 V.
When switches S2, S3 are closed, the following holds:
Iv=Iv_p and Iv_m=0
Rg=Rp*Rm/(Rp+Rm)
Rp=[rd zdf*(Rtp+rdson_TH+rd_THf)/zdf+Rtp+rdson_TH+rd_THf)]=0.171 ohm
Rm=[rd_zdf+rd_df*(Rtm+rdLSf)/(rd_df+Rtm+rdLS)]=0.457 Ohm
Rg=0.1244 ohm
Iv_p/Iv=Rg/Rp->Iv_p=Iv*Rg/Rp=Iv*0.727
R_HS=Rtp+rdson_TH+rd_THf=1.2 ohm
IHS/Iv_p=Rp/R_HS=0.1425;
IHS=Iv_p*0.1425=Iv*0.727*0.1425=Iv*0.1036
For IHSmax=6 A->Ivmax=58 A
Iv_m=0.273*Iv
ILS/Iv_m=(Rm−rd_zdf)/(Rtm+rd_LSf)=0.257/0.533=0.482
ILS=Iv*0.273*0.482=Iv*0.132
For ILSmax=6 A->Ivmax=46 A.

The ignition circuit wiring having the protective device for the crash zone theoretically increases the robustness of the high side end stage against destruction by approximately a factor of 10 relative to a standard design. However, because destruction of the low-side end stage must not be allowed to occur, the achievable value is lower, approximately a factor of 7 to 8.

Due to the new protective wiring of the crash zones, brief injection current peaks of approximately 40 A . . . 50 A can be tolerated without destruction of the ignition circuit end stages and/or RESET of the system ASIC.

The temporal load limit is approximately 100 μs, but can be adapted by selecting different diodes.

The required injection current limit of 20 A@1 mH@0.8 ohms is reached without problems.

Figure 12:
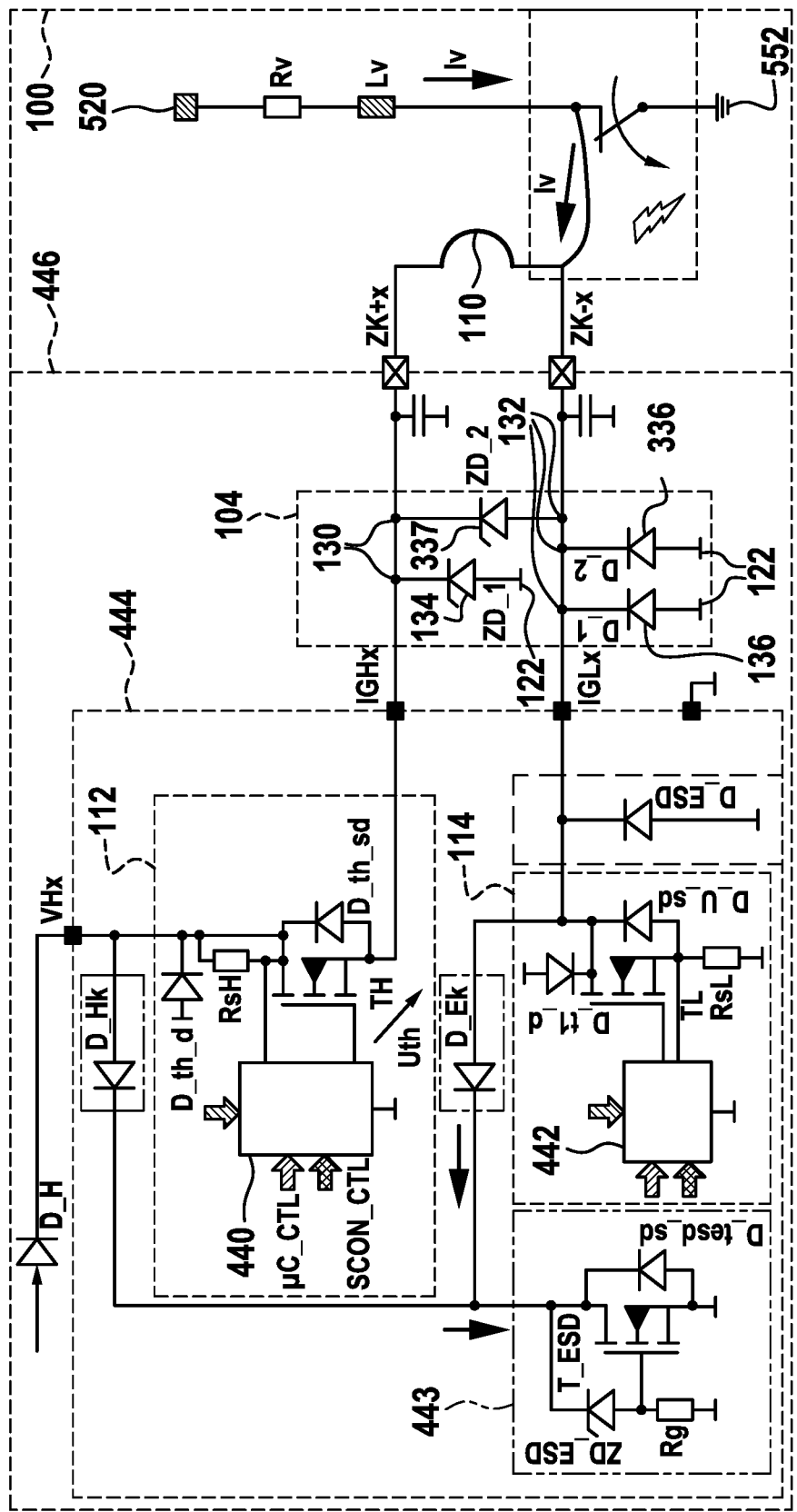
FIG. 12 shows a schematic representation of possible injection currents relating to the trip circuit shown in FIG. 6 according to an exemplary embodiment.

FIG. 12 shows a schematic representation of possible injection currents relating to the trip circuit shown in FIG. 6, according to an exemplary embodiment. In particular, here positive injection currents of small consumers are shown.

In addition to the risks described above of negative injection currents of an injection circuit 110 in the crash zone, positive injection currents Iv of small consumers can also arise if these are not screwed to chassis GND 552, but rather have a ground cable.

Protective circuit 104 is effective for this case as well. The suppressor diode pair ZD_1, ZD_2 that is used clamps when the VBR voltage (27 V) is exceeded, and thus relieves the load on central ASIC-ESD clamp element 443 (pos. IGH/IGL ESD-P), which opens starting from approximately 38 V injection circuit voltage, and can accept approximately 4 A given an internal resistance of approximately 2 ohms including coupling diodes D_LK, D_HK without damage and reset. As a result, the overall clamping power increases to approximately 6 A.

FIG. 12 shows the genesis and effect of positive injection currents. In the case of high injection currents, only a "no fire" current is conducted via squib 110. Suppressor diode ZD_2, configured in parallel, conducts a portion of up to 2 A of the injection current in the direction of the ZD_1 suppressor diode.

In this way, the voltage at ZK+ is clamped at approximately 47 V (rd_zdr=10 ohms). Because the ZD_1 clamping voltage is above the ASIC central clamping voltage of 38 V, this also accepts a high portion of the injection current (4 A), at approximately 2 ohms internal resistance.

Likewise, a current injection at ZK+ is possible without "no fire" current exceeding of squib 220 and corresponding division of the clamp power between ZD_1 and the ASIC clamp element.

If an exemplary embodiment includes an "and/or" linkage between a first feature and a second feature, this is to be read as meaning that according to a specific embodiment the exemplary embodiment has both the first feature and the second feature, and according to a further specific embodiment the exemplary embodiment has either only the first feature or only the second feature.

What is claimed is:

1. A protective device for a trip circuit for a personal protection device for a vehicle, comprising:
   a high-side interface for contacting the protective device to a high-side terminal of an ignition device and a low-side interface for contacting the protective device to a low-side terminal of the ignition device, the trip circuit having the ignition device, a high-side end stage for connecting the high-side terminal of the ignition device to a first voltage potential and a low-side end stage for connecting the low-side terminal of the ignition device to a second voltage potential;
   a suppressor diode connected between the high-side interface and a terminal that, in an operation-ready state of the protective device, conducts the first voltage potential; and
   at least one first diode connected between the low-side interface and another terminal that, in an operation-ready state of the protective device, conducts the second voltage potential;
   wherein the trip circuit is configured to protect against undesired effects of an injection current that, for a collision of the vehicle and a resulting deformation of the vehicle, can be injected into a conductor segment of the trip circuit,
   wherein the high-side end stage has functionalities of a driver, a regulator, and of a device that realizes a logic system via which a switch, which is a transistor of the high-side end stage, is controlled, and
   wherein the low-side end stage has functionalities of a driver, a regulator, and of a device that realizes a logic system, via which a switch, which includes a transistor of the low-side end stage, is controlled.

2. The protective device of claim 1, wherein the anode of the suppressor diode and/or the anode of the first diode is connected to the second voltage potential.

3. The protective device of claim 1, further comprising:
   a second diode connected between the low-side interface and the second voltage potential.

4. The protective device of claim 3, wherein the first diode and the second diode are situated on a die.

5. The protective device of claim 1, further comprising:
a further suppressor diode connected between the high-side interface and the low-side interface.

6. The protective device of claim 5, wherein the suppressor diodes are situated on a further die.

7. The protective device of claim 1, wherein the ignition device includes an airbag ignition circuit.

8. A trip circuit for a personal protection device for a vehicle, comprising:
- an ignition device;
- a high-side end stage for connecting a high-side terminal of the ignition device to a terminal that, in an operation-ready state of the protective device, conducts a first voltage potential;
- a low-side end stage for connecting a low-side terminal of the ignition device to another terminal that, in an operation-ready state of the protective device, conducts a second voltage potential; and
- a protective device, including:
  - a high-side interface for contacting the protective device to the high-side terminal of the ignition device and a low-side interface for contacting the protective device to the low-side terminal of the ignition device;
  - a suppressor diode connected between the high-side interface and the second voltage potential; and
  - at least one first diode connected between the low-side interface and the second voltage potential;
- wherein the trip circuit is configured to protect against undesired effects of an injection current that, for a collision of the vehicle and a resulting deformation of the vehicle, can be injected into a conductor segment of the trip circuit,
- wherein the high-side end stage has functionalities of a driver, a regulator, and of a device that realizes a logic system via which a switch, which is a transistor of the high-side end stage, is controlled,
- wherein the low-side end stage has functionalities of a driver, a regulator, and of a device that realizes a logic system, via which a switch, which includes a transistor of the low-side end stage, is controlled, and
- wherein the protective device contacts the high-side terminal of the ignition device via the high-side interface, and contacts the low-side terminal of the ignition device via the low-side interface.

9. A method for protecting a trip circuit for a personal protection device for a vehicle from an effect of an injection current injected into the trip circuit, the method comprising:
- discharging at least a part of the injection current via a suppressor diode connected between a high-side terminal and a second voltage potential, the trip circuit having an ignition device, a high-side end stage for connecting the high-side terminal of the ignition device to a terminal that, in an operation-ready state of the protective device, conducts a first voltage potential and a low-side end stage for connecting a low-side terminal of the ignition device to another terminal that, in an operation-ready state of the protective device, conducts a second potential; and
- discharging at least a part of the injection current via at least one first diode connected between the low-side terminal and the second voltage potential;
- wherein the trip circuit is configured to protect against undesired effects of an injection current that, for a collision of the vehicle and a resulting deformation of the vehicle, can be injected into a conductor segment of the trip circuit,
- wherein the high-side end stage has functionalities of a driver, a regulator, and of a device that realizes a logic system via which a switch, which is a transistor of the high-side end stage, is controlled, and
- wherein the low-side end stage has functionalities of a driver, a regulator, and of a device that realizes a logic system, via which a switch, which includes a transistor of the low-side end stage, is controlled.

10. The method of claim 9, wherein, in at least one of the discharging tasks, at least a part of the injection current is discharged through a parallel path formed by a suppressor diode that is connected between the low-side terminal and the high-side terminal.

* * * * *